US005126700A

United States Patent [19]

Curtin et al.

[11] Patent Number: 5,126,700

[45] Date of Patent: Jun. 30, 1992

[54] PHASE STABLE RF TRANSPORT SYSTEM

[75] Inventors: Michael T. Curtin, Los Alamos, N. Mex.; Eckard F. Natter, San Francisco, Calif.; Peter M. Denney, Los Alamos, N. Mex.

[73] Assignee: The United States of America as represented by the United States Department of Energy, Washington, D.C.

[21] Appl. No.: 656,325

[22] Filed: Feb. 19, 1991

[51] Int. Cl.[5] ............ H04B 3/10

[52] U.S. Cl. ............ 333/16; 333/134; 328/155

[58] Field of Search ............ 328/155; 333/16, 17.1, 333/126, 128, 134, 139, 156

[56] References Cited

U.S. PATENT DOCUMENTS

| | | | |
|---|---|---|---|
| 3,790,906 | 2/1974 | Fletcher et al. | 333/16 |
| 4,427,953 | 1/1984 | Hudspeth et al. | 333/134 |

*Primary Examiner*—Steven Mottola

*Attorney, Agent, or Firm*—Ray G. Wilson; Paul D. Gaetjens; William R. Moser

[57] ABSTRACT

An RF transport system delivers a phase-stable RF signal to a load, such as an RF cavity of a charged particle accelerator. A circuit generates a calibration signal at an odd multiple frequency of the RF signal where the calibration signal is superimposed with the RF signal on a common cable that connects the RF signal with the load. Signal isolating diplexers are located at both the RF signal source end and load end of the common cable to enable the calibration to be inserted and extracted from the cable signals without any affect on the RF signal. Any phase shift in the calibration signal during traverse of the common cable is then functionally related to the phase shift in the RF signal. The calibration phase shift is used to control a phase shifter for the RF signal to maintain a stable RF signal at the load.

8 Claims, 3 Drawing Sheets

PHASE STABLE RF TRANSPORT SYSTEM

This invention is the result of a contract with the Department of Energy (Contract No. W-7405-ENG-36).

BACKGROUND OF INVENTION

This invention relates to RF signal transmission systems and, more particularly, to RF signal transmission systems where the signal source is remote from the load.

There are many applications where a phase-stable RF signal must be transported some distance from the signal source to a load. For example, in the Ground Test Accelerator (GTA) signals must be transported between a RF master reference generation oscillator and each individual control rack (RF Reference Transport) as well as between RF cavities and the associated control racks located away from the cavities (Field Sense Transport), where phase errors contribute directly to errors in cavity-to-cavity phase of the accelerator. The GTA system requires an insertion phase tolerance of $\pm 0.15$ degrees for each transport cable. This system is a fixed frequency system and frequency-dependent effects are not of concern. Temperature changes, however, affect the electrical length and transmission delay time of the coaxial cable, with concomitant changes in the signal insertion phase. For example, over a 250-foot run of cable, an ambient temperature range of 23° to 43° C. can introduce as much as 8 degrees of electrical phase change at 425 MHz in phase stabilized coaxial cable, more than 50 times the tolerable limit for GTA.

There have been several attempts to solve this problem. In one approach, a controlled environment is maintained for the transmission cable. In another approach, described in H. D. Schwarz et al., "The RF Reference Line for PEP," NS-26 IEEE Trans. Nucl. Sci., pp. 1987–1989 (March 1989), a portion of the RF signal is modulated at the accelerator end of the cable and reflected back to the RF signal end of the cable. The signal is demodulated and the phase change in the modulation signal is determined for use in shifting the RF signal phase at the accelerator. However, active components are required adjacent the accelerator and they are not suitable for use in a radiation environment. Yet another approach used a fiber optic RF distribution system, but still required active components in close proximity to the RF cavities.

In accordance with the present invention, a phase-stabilized RF signal is delivered to a load that is remote from the signal source where the phase stabilization is obtained with only passive components adjacent the load. Accordingly, it is an object of the present invention to provide a phase control loop with only passive components adjacent the load.

It is another object of the present invention to provide a phase control loop for use in a high radiation environment.

One other object of the present invention is to obtain a phase-stabilized RF signal path without the need for precise environmental control.

Yet another object of the present invention is to maintain the phase-stabilized RF signal path in the absence of the RF signal to enable the phase-stabilized transport of pulsed RF signals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a RF transport system for delivering a phase-stable RF signal to a load. A circuit generates a calibration signal at a multiple frequency of the RF signal. Cable means delivers the RF signal and the calibration signal adjacent the load using a common cable. A phase control loop including the common cable then controls the phase of the RF signal as a function of the phase shift in the calibration signal during transport over the cable means.

In the phase control loop, a diplexer provides for combining or separating the RF and calibration signals. In the diplexer, a conductor is grounded at each end and has an electrical length effective to provide standing waves for the RF signal and the calibration signal. A first port for connecting the calibration signal electrically contacts the conductor at a node location of the RF signal standing wave. A second port for connecting the RF signal electrically contacts the conductor at a node location of the calibration signal standing wave. A third port electrically contacts the conductor at a location intermediate the RF signal contact and the calibration signal contact, wherein a load on the third port does not effect the standing wave nodes. The input/output from the third port is a combined signal including the RF and calibration signals.

In another characterization of the present invention, a method is provided for delivering a phase-stable RF signal to a load distant from the generation of the RF signal. A calibration signal is generated at a multiple frequency of the RF signal. The RF and calibration signals are delivered adjacent the load along a common cable. The phase of the RF signal is controlled as a function of phase shift in the calibration signal during transport over the common cable.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE INVENTION

Figure 1:
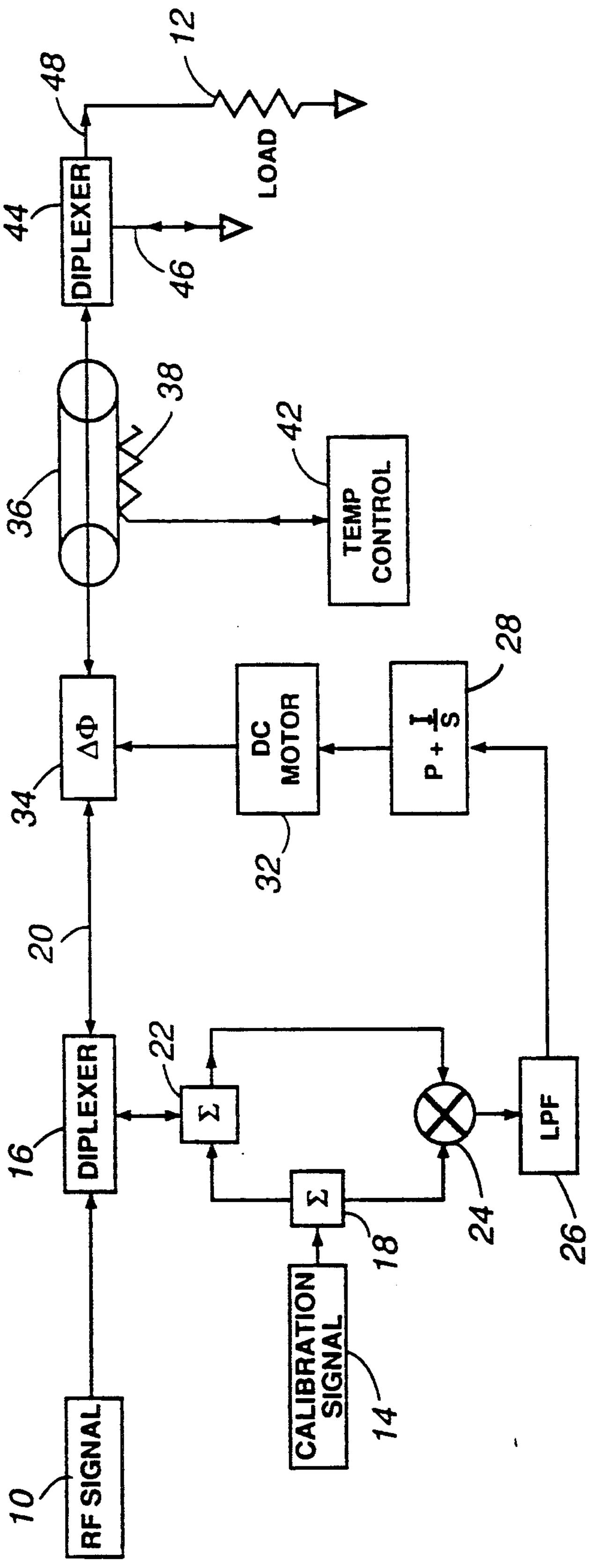
FIG. 1 is a schematic of a phase stabilizing circuit, in block diagram form, according to one embodiment of the present invention.

A functional block, diagram of a phase-stable RF transport system according to one embodiment of the present invention is shown in FIG. 1. A RF reference signal is generated by source 10, e.g., an RF oscillator, for transport and, delivery to a load 12 that requires a phase-cable RF signal, e.g., an accelerator using a series of RF accelerating cavities. It will be appreciated that load 12 may be remote from source 10 with signal transport along cables experiencing environmental fluctuations that affect the phase of the delivered RF signal. Many signals, such as those used to control the field of an accelerator structure, require a high degree of phase stability, i.e., a small phase error. Further, some sources or loads are located in environments that are detrimental to active electronic components or to repair activities.

The circuit shown in FIG. 1 places the active phase stabilization components at the RF signal end of the signal transport system. It will be understood, however, that the active components could be placed at the load end of the signal transport system if the source environment is unsuitable for active components. The RF signal is provided by source 10. Likewise, a RF calibration signal is output by calibration source 14. The outputs of signal source 10 and calibration source 14 are provided to diplexer 16 for subsequent combination on cable 36. Diplexer 16 either combines or separates two signals of different frequencies with a high degree of isolation between the two signals.

As hereinafter explained, diplexer 16 provides standing waves for the RF and calibration signals wherein signal separation is provided by inputting one signal at a standing wave node of the other signal. Accordingly, calibration source 14 provides an output frequency that is a multiple of the input frequency effective to produce a standing wave on a common conductor with the standing wave produced by the RF signal. In a preferred embodiment, the output calibration signal frequency is 1.5 times the input RF frequency to enable the two standing waves to be maintained on a single conductor.

Calibration signal source 14 provides an output to signal splitter \ combiner 18 to provide an output to signal splitter \ combiner 22 for subsequent output to diplexer 16 and an output to phase comparator 24. Diplexer 16 also outputs a return calibration signal to signal splitter \ combiner 22 for output to phase comparator 24. Comparator 24 outputs a signal functionally related to the phase difference between the generated calibration signal and the return calibration signal. A frequency component of the phase difference signal is selected by low pass filter 26 for input to feedback controller 28, which applies both proportional and integral control actions to DC motor 32 for actuating phase shifter 34. In one embodiment, phase shifter 34 is mechanically actuated by motor 32 to compensate for any change in electrical length of transport cable 36, generally holding constant the combined electrical length of phase shifter 34 and cable 36. Thus, a phase control loop is formed by calibration signal source 14, signal splitters 18 and 22, diplexers 16 and 44, phase comparator 24, low pass filter 26, feedback controller 28, motor 32, phase shifter 34, and cable 36.

Combined signal 20 with RF signal and calibration signal components is output from diplexer 16 through phase shifter 34 to common cable 36. Cable 36 may be heated by heater 38, where temperature controller 42 maintains the cable temperature above some minimum temperature where extreme temperature variations occur. Combined signal 20 is output from cable 36 to diplexer 44 for separation into RF signal 48 for delivery to load 12 and calibration signal 46 for delivery into a shorted line. The shorted line reflects the calibration signal back into diplexer 44 and through cable 36 and phase shifter 34 to diplexer 16. The reflected calibration signal is output from diplexer 16 for phase comparison with the generated calibration signal at comparator 24.

The signal isolation properties of diplexers 16, 44 allow the RF signal to be superimposed with the calibration and reflected calibration signals on a common transport cable 36 and extracted and delivered to the load without interfering with the operation of the phase control loop. Since the calibration signal is transported along the same cable path as the RF signal, the phase change in the calibration signal is functionally related to the phase change in the RF signal. Feedback controller 28. DC motor 32, and phase shifter 34 act to maintain the output from comparator 24 at some predetermined value, which may be zero, to maintain the phase stability of the RF signal at load 12.

It will be appreciated that the signal isolation properties of diplexers 16 and 44 allow the RF signal to be superimposed upon and extracted from transport cable 36 independent of the operation of the phase control loop. Thus, source 10 and load 12 could be switched without effect on phase control. Further, the phase control functions with or without the presence of an RF signal so that pulsed RF signals could be transmitted with the same phase stability as a continuous RF signal.

Figure 2:
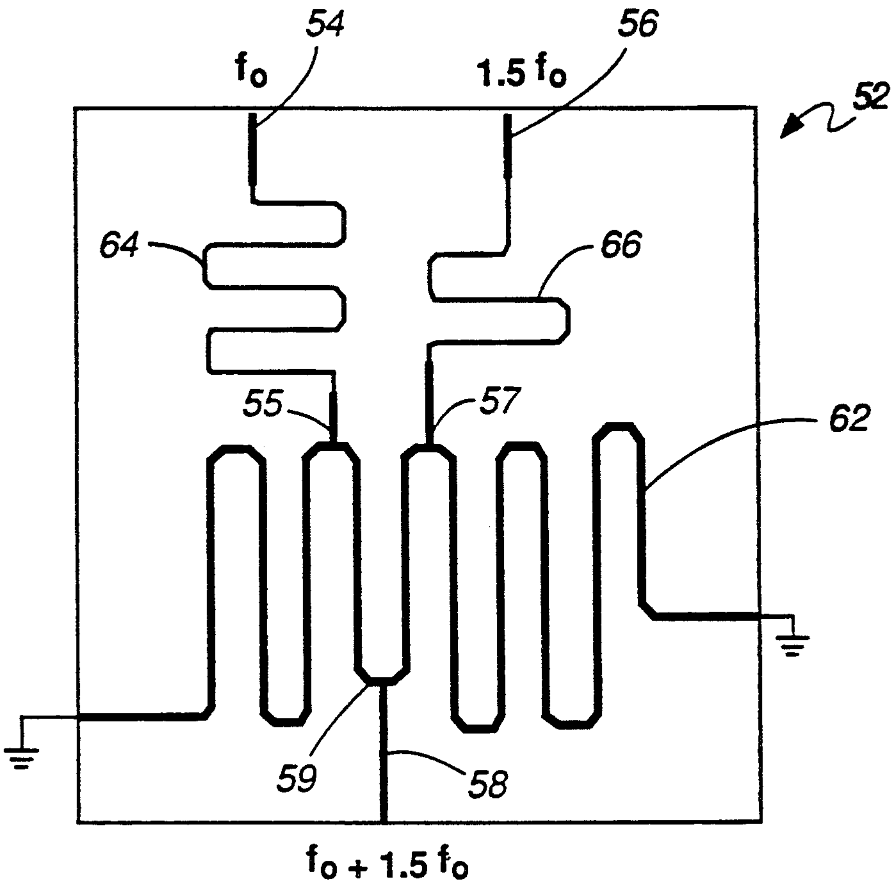
FIG. 2 is a pictorial representation of a diplexer for use in the circuit shown in FIG. 1.

In accordance with the present invention, oscillator 10 operates at a fixed frequency and diplexers 16 and 44 are designed with passive components to provide substantial signal isolation between the input and output ports. Referring now to FIG. 2, a pictorial illustration of the design of diplexer 52 is depicted. Conductor 62 is grounded at both ends and has an electrical length effective to resonate at both the RF signal and calibration signal frequencies. As shown, the RF signal is $f_o$ and the calibration signal is $1.5f_o$. The configuration of the standing waves for $f_o$ and $1.5f_o$ on conductor 62 is shown in FIG. 3.

RF signal port 54 is electrically connected to conductor 62 at connection 55, a node point on the calibration signal standing wave $1.5\ f_o$. Likewise, calibration signal port 56 is electrically connected to conductor 62 at connection 57, a node point on the RF signal standing wave $f_o$. Thus, the RF and calibration signals are physically input where the other signal has a zero value to provide good isolation and signal separation. The common port 58 for the combined signal $f_o+1.5f_o$ is connected to conductor 62 at connection 59 intermediate between connections 55 and 57. It was found that a tap at this location left the standing wave nodes undisturbed, whereas placing connection 58 at other locations severely degraded the isolation between $f_o$ port 54 and $1.5f_o$ port 56. As shown in FIG. 2, quarter-wave matching sections are placed to connect ports 54 and 56 to connections 55 and 57, respectively, to minimize the reflection coefficients and insertion losses of the $f_o$ and $1.5f_o$ signal frequencies.

It will be appreciated that a diplexer 52 is used in both the signal path and the control path so the phase stability of the overall loop depends on the phase stability of diplexer 52. Diplexer 52 is preferably formed for microstrip application on RT \ duroid 6002 dielectric. RT \ duroid 6002 has tight permittivity tolerance and a stable dielectric permittivity with respect to temperature. A diplexer according to the above design was built for operation at 435 MHz ($f_o$). At $f_o$, the isolation between the $f_o$ and $1.5f_o$ ports 54 and 56 was better than 35 dB, the input return loss at all ports of interest was better than 20 dB, and the total insertion loss due to two diplexers (see diplexers 16 and 44, FIG. 1) was only 1.3 dB. At $1.5f_o$, the isolation was better than 35 dB, the input return loss was better than 20 dB, and the return loss of the $1.5f_o$ signal due to two diplexers with the $1.5 f_o$ port of diplexer 44 shorted was only 2 dB. Further the temperature stability of diplexer 52 design was tested over 10° to 50° C., where the phase change was less than 0.5°, which would result in a RF signal phase error of about 0.2 electrical degrees after operation of the phase control loop. For normal ambient temperature variations (20°-24° C.), the RF signal phase error was maintained within ±0.065° over a 68 hour period.

Figure 4:
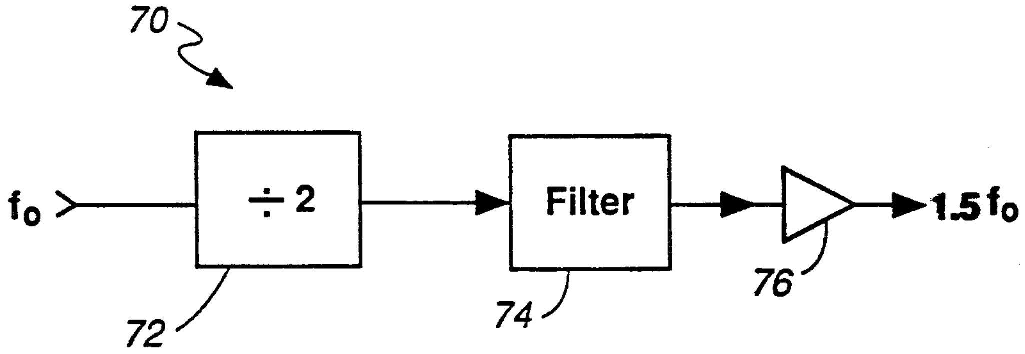
FIG. 4 is a schematic, in block diagram form, of a non-integral frequency multiplier for use in the circuit of FIG. 1.
Figure 3:
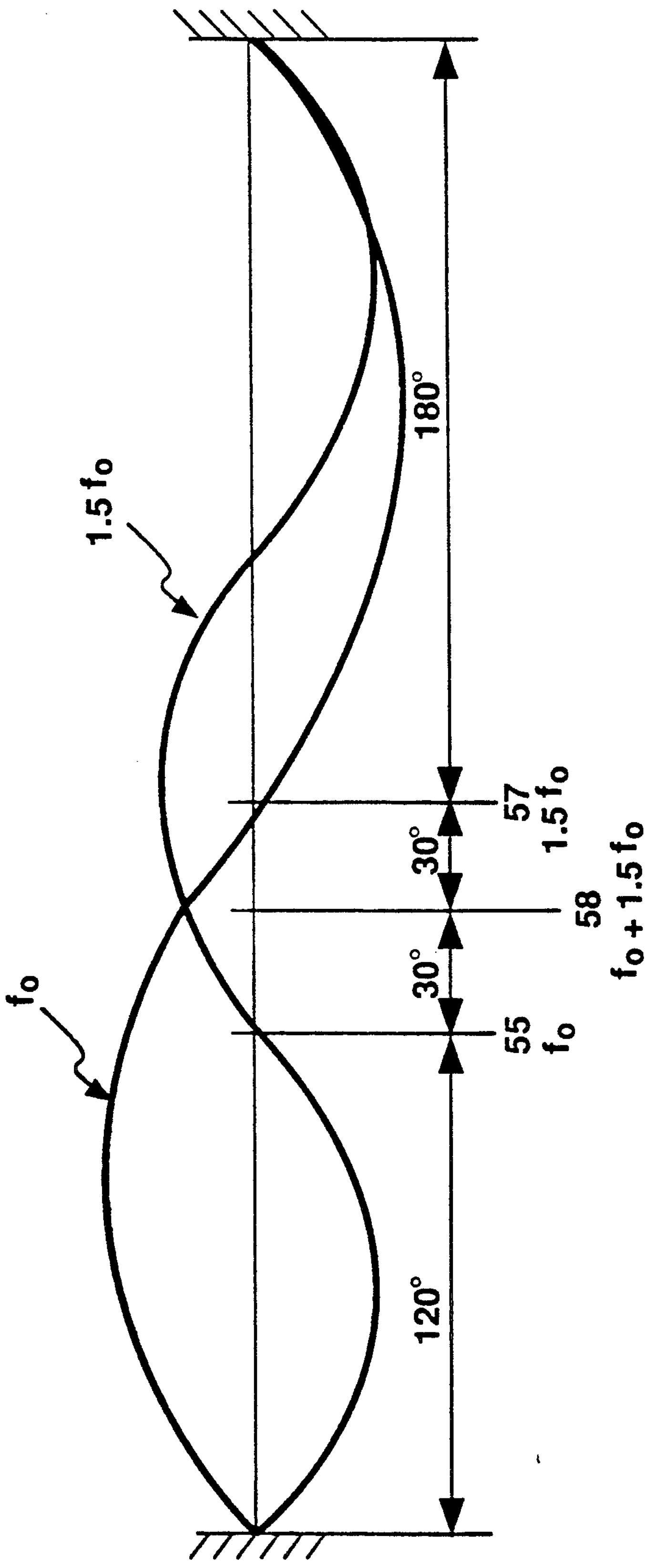
FIG. 3 illustrates the standing wave patterns and port connection locations along the standing waves for the diplexer of FIG. 2.

As shown in FIGS. 1 and 3, the calibration signal frequency is a non-integral multiple of the RF signal frequency, preferably a multiple of 1.5 to obtain the standing wave node relationships shown in FIG. 3. FIG. 3 graphically depicts the standing wave amplitudes as a function of the resonant electrical conductor 62 length in electrical degrees at frequency $f_o$. A suitable non-integral multiplication circuit 70 is shown in FIG. 4. A continuous wave (cw) RF signal $f_o$ is input to divide-by-two circuit 72, e.g., a set-reset flip-flop. Since the output of circuit 72 is a square wave of frequency $0.5 f_o$, the square wave may be resolved into a series of odd multiples of the fundamental frequency. Thus, the signal output 73 from divide-by-two circuit 72 contains non-integral multiples of the fundamental frequency $f_o$, i.e., 0.5, 1.5, 2.5, etc., that are passed through a bandpass filter 74 to output only the selected non-integral multiple, $1.5f_o$ in this case. Amplifier 76 restores the amplitude of the $1.5f_o$ calibration signal for use in the phase control loop.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A RF transport system for delivering a phase-stable RF signal to a load, comprising:
- circuit means for generating a calibration signal at a multiple frequency of said RF signal;
- cable means for transporting said RF signal and said calibration along a common cable connecting said RF signal to said load;
- first circuit means for combining said RF and calibration signals for input to said common cable;
- second circuit means for separating said RF and calibration signals at the output of said common cable;
- third circuit means for reflecting said calibration signal back along said common cable;
- fourth circuit means for determining the phase difference between said generated calibration signal and said reflected calibration signal; and
- means responsive to said phase difference to adjust the electrical length of said common cable to maintain said phase difference at a determined value.

2. A RF transport system according to claim 1, wherein said calibration signal is a non-integral frequency multiple of said RF signal with common zero crossings at preselected periods.

3. A RF transport system according to claim 2, wherein said calibration signal frequency is a multiple of 1.5 of said RF signal frequency.

4. A RF transport system according to claim 1, wherein said phase control loop means includes a diplexer for separating or combining said RF and calibration signals.

5. A RF transport system according to claim 4, wherein said diplexer includes:
- a conductor grounded at each end and having an electrical length at the frequency of said RF signal effective to provide standing waves for said RF signal and said calibration signal between said grounded ends;
- a first port electrically connecting said calibration signal to said conductor at a node location of said RF signal standing wave;
- a second port electrically connecting said RF signal to said conductor at a node location of said calibration signal standing wave; and
- a third port electrically contacting said conductor at a location intermediate said RF signal contact and said calibration signal contact, wherein a load on said third port does not effect said standing wave nodes.

6. A RF transport system according to claim 5, further including quarter wave matching sections between said first port and said conductor and between said second port and said conductor to minimize reflection coefficients and insertion losses therebetween.

7. In a RF transport system for combining or separating multiple RF signals, a diplexer comprising:
- a conductor grounded at each end and having an electrical length effective to provide standing waves for a RF signal and a calibration signal between said grounded ends;
- a first port electrically connecting said calibration signal to said conductor at a node location of said RF signal standing wave;
- a second port electrically connecting said RF signal to said conductor at a node location of said calibration signal standing wave; and
- a third port electrically contacting said conductor at a location intermediate said RF signal contact and said calibration signal contact, wherein a load on said third port does not effect said standing wave nodes.

8. A diplexer according to claim 7, further including quarter wave matching sections between said first port and said conductor and between said second port and said conductor to minimize reflection coefficients and insertion losses therebetween.

* * * * *